United States Patent [19]

Bricheno et al.

[11] Patent Number: 5,633,965
[45] Date of Patent: May 27, 1997

[54] OPTICAL FIBRE BRAGG DISTRIBUTED GRATINGS

[75] Inventors: Terry Bricheno, Great Sampford; Alan Fielding, Bishop's Stortford; Michael F. Grant, Harlow, all of United Kingdom

[73] Assignee: Northern Telecom Limited, Montreal, Canada

[21] Appl. No.: 335,259

[22] Filed: Nov. 7, 1994

[30] Foreign Application Priority Data

Nov. 10, 1993 [GB] United Kingdom ............... 9323226

[51] Int. Cl.$^6$ ............................................. G02B 6/34
[52] U.S. Cl. .................................... 385/37; 385/43
[58] Field of Search ....................... 385/37, 27, 48, 385/43, 96

[56] References Cited

U.S. PATENT DOCUMENTS

| | | | |
|---|---|---|---|
| 5,093,876 | 3/1992 | Henry | 385/28 |
| 5,142,660 | 8/1992 | Chang | 385/10 |
| 5,218,655 | 6/1993 | Mizrahi | 385/39 |
| 5,276,746 | 1/1994 | Adar et al. | 385/27 |
| 5,408,555 | 4/1995 | Fielding et al. | 385/43 |
| 5,410,626 | 4/1995 | Okuta et al. | 385/43 |
| 5,420,950 | 5/1995 | Koya et al. | 385/43 |

FOREIGN PATENT DOCUMENTS

| | | |
|---|---|---|
| 0468715 | 1/1992 | European Pat. Off. |
| 63-8710 | 1/1988 | Japan ............ 385/43 |
| 2150703 | 7/1985 | United Kingdom. |
| 2161612 | 1/1986 | United Kingdom. |
| 2248311 | 4/1992 | United Kingdom. |

OTHER PUBLICATIONS

Meltz, "Formation of Bragg gratings in optical fibers by a transverse holographic method", Optics Letters, vol. 14, No. 15, Aug. 1, 1989, pp. 823–825.

Askins, "Fiber Bragg reflectors prepared by a single excimer pulse", Optics Letters, vol. 17, No. 11, Jun. 1, 1992, pp. 833–835.

Bilodeau, "High–Return–Loss Narrowband All–Fiber Bandpass Bragg Transmission Filter", IEEE Photonics Technology Letters, vol. 6, No. 1, Jan., 1994, pp. 80–81.

OFC/IOOC 93 Tutorial Sessions, pp. 397–398 Nov. 1993.

Primary Examiner—John D. Lee
Assistant Examiner—Phan T. H. Palmer
Attorney, Agent, or Firm—Lee, Mann, Smith, McWilliams, Sweeney & Ohlson

[57] ABSTRACT

Optical fiber elements, such as narrow pass-band filters, dispersion equalizers, and channel dropping filters, are constructed from 2×2 single mode optical fiber fused tapered couplers having formed on one side of coupling regions Bragg distributed gratings in the two fibers from which the coupler is constructed. By making the gratings at a point where the fibers remain fused together in side-by-side contact it is ensured that they lie equidistant from the coupling region.

16 Claims, 4 Drawing Sheets

OPTICAL FIBRE BRAGG DISTRIBUTED GRATINGS

BACKGROUND TO THE INVENTION

A known single mode optical fiber component is the optical fiber Bragg distributed grating. Such a component is useful as an optical filter which can readily be made in a form that is both relatively highly wavelength selective and polarization state insensitive.

One method by which such a grating can be made is described in GB 2 161 612A, and involves launching a high-power beam of light into a length of photo-responsive single mode fiber and using a reflector to set up a standing-wave pattern in the fiber. This standing-wave pattern produces localized changes in the refractive index of the fiber resulting in the production of a barrow stop-band filter that is selectively reflective at the wavelength of light employed to make the grating. Another method by which such a grating can be written is described by G Meltz et al in article entitled: "Formation of Bragg Gratings in Optical Fibers by Transverse Holographic Method", Optics Letters, 1989, 14, (15), pp 823–825. This involves illuminating the fiber from the side with a holographically generated grating fringe pattern. When such fringe patterns are generated with interfering beams of collimated light, the resulting grating is of uniform pitch, though chirped gratings can also be generated by the expedient of using interfering beams of differing divergence.

Both types of method of making distributed Bragg gratings so far described have involved the use of light to create a phase grating in the fiber. A different type of grating, known as a type II grating, is similarly made in single mode optical fiber by lateral holographic illumination, but in this instance the grating fringe pattern is formed much more rapidly, typically using a single short duration pulse from an excimer laser. The creation of such type II gratings is for instance described by C. G. Askins et al in an article entitled: "Fiber Bragg Reflectors Prepared by a Single Excimer Pulse", Optics letters, 1992, 17 (15) pp 833–835.

Another known single mode optical fiber component is the 2×2 single mode optical fiber fused tapered coupler. This may be produced in a highly reproducible manner by a progressive stretching method substantially as described in GB 2 150 703A. The essence of this progressive stretching method of making such a coupler is that two substantially identical optical fibers are stranded together and mounted between a pair of clamps that themselves are mounted on independent motor-driven linearly sliding carriages. The two sliding carriages move along a common axis, and the stranded fibers are arranged to extend parallel to this axis. Movement of the two carriages in the same direction, but with the leading carriage constrained to move slightly faster than the trailing carriage, causes the fibers to be progressively stretched. A relatively sharply localized hot zone, provided for instance by a methane oxygen flame issuing from the end of a length of hypodermic tubing, is moved into position where it locally heat-softens the fibers so that their stretching is accommodated by plastic flow confined to the region of the hot zone. The traversing of the two carriages means that the localized plastic flow is itself traversed along the fibers at a controlled rate. In this way a single traverse of the carriages will produce a drawn-down region of the fibers, the length of which is determined by the extent of the traverse. The cross-sectional reduction is independent of the length of the traverse, and is determined by the ratio of the speeds at which the two carriages are driven. To make a fused fiber coupler by this progressive stretching method, several, or even a few tens of, traverses may be employed to achieve the requisite aggregate drawdown ratio.

SUMMARY OF THE INVENTION

The present invention is directed to optical elements that incorporate both these types of component, the Bragg grating and the 2×2 coupler, in an integrated form.

According to the present invention there is provided an optical fiber element incorporating a 2×2 single mode tapered fused fiber coupler structure formed from two single mode optical fibers of substantially identical cross-section secured together in side-by-side contact over a length that includes sequentially a first portion where the fibers are drawn down to an extent providing mutual optical coupling between the two fibers, and a second portion in which there is substantially no mutual coupling between the fibers and in which second portion substantially identical Bragg distributed gratings are formed in both fibers equidistant from said first portion.

The present invention also provides a method of making an optical fiber element from two single mode optical fibers of substantially identical cross-section, in which method the two fibers are fused together in side-by-side contact over a specific length thereof, wherein mutual coupling between the two fibers over a first portion of said length is created by drawing them down using a set of progressive stretching operations upon the fibers while they are traversed longitudinally through a localized hot zone in which they are locally heat-softened, and wherein, at a second portion of said length beyond said first portion, Bragg distributed gratings are created simultaneously in both fibers equidistant from said first portion.

BRIEF DESCRIPTION OF THE DRAWINGS

There follows a description of optical elements embodying the invention in preferred forms. In relation to the first preferred embodiment to be described, this description is prefaced for the purposes of comparison with a description of alternative structures capable of providing a somewhat analogous function.

The description refers to the accompanying drawings, in which.

DETAILED DESCRIPTION OF PREFERRED EMBODIMENTS

The first optical element to be described that embodies the present invention is a narrow pass-band filter. As explained previously, the writing of a uniform pitch Bragg distributed grating on a uniform length of single mode optical fiber induces a narrow stop-band filter characteristic in that fiber by virtue of the fact that grating acts to reflect light of a particular wavelength determined by the pitch of the grating and the propagation constant of the fiber. If that fiber, depicted at 10 in FIG. 1 with its Bragg grating 11, is spliced to one port (port b) of a three-port optical circulator 12, the combination will function as a narrow pass-band filter when viewed from port c for light launched in to the circulator by way of port a. There are a number of drawbacks to this approach. One is that, because of the presence of the circulator, the device is non-reciprocal, and therefore the combination does not function as a narrow pass-band filter when viewed from port a for light launched in to the combination by way of port c. Other drawbacks include the cost, complexity and spectral limitations of circulators.

Figure 1:
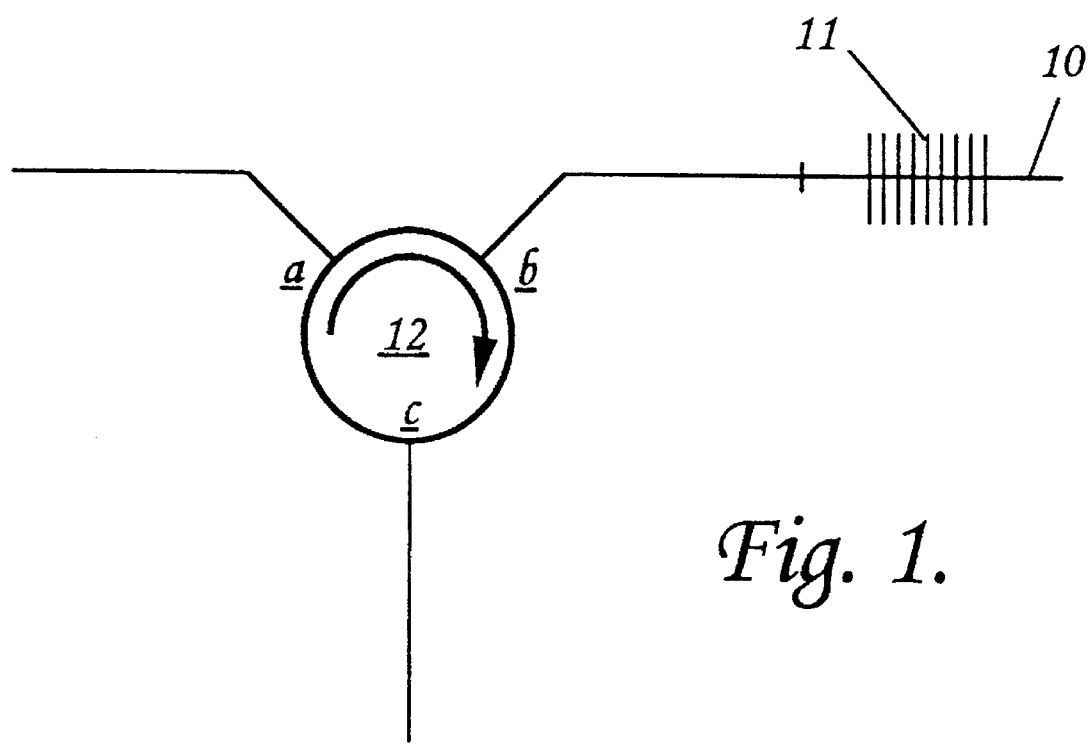
FIG. 1 depicts an optical element incorporating an optical fiber Bragg distributed grating and a circulator
Figure 2:
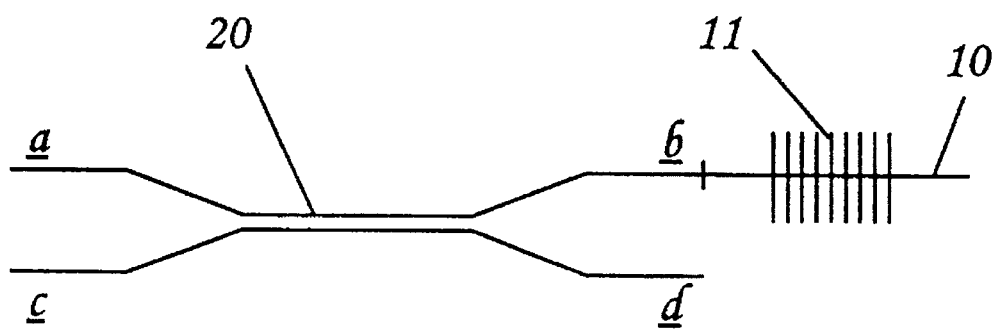
FIG. 2 depicts a modification of the element of FIG. 1 in which the circulator has been replaced by a 2×2 fused fiber 3 dB coupler

These problems of the circulator may all be avoided by replacing, the circulator of FIG. 1 with a 2×2 single mode optical fiber fused tapered coupler 20 as depicted in FIG. 2. The input and output ports of this filter are ports a and c of the coupler 20. The theoretical minimum loss of such a filter is 6 dB, this occurring when the coupler is a 3 dB coupler. Under these circumstances, if light is launched into port a, it suffers a 3 dB loss in propagating through the coupling region and into the fiber 10, and any light that is reflected in fiber 10 suffers a further 3 dB loss in propagating back through the coupler to port c. It will also be apparent that there is a similar 6 dB reflection back into port a.

It might appear that these problems could be overcome by also terminating port d of the coupler with a length of single mode fiber incorporating a Bragg distributed grating just like that terminating port b. The practical difficulty of this approach is that the light reflected by the grating associated with port b will interfere in the coupling region of coupler 20 with that reflected by the grating associated with port d. As a result of this interference, the attenuation presented by such a filter can vary between zero and infinity according to the phase relationship between the two beams reflected back respectively into ports b and d. In principle this difficulty could be overcome by inserting a phase adjustment means (not shown) between the coupler 20 and one of the Bragg distributed gratings. Such a phase shifter could be adjusted to introduce the amount of phase shift to bring the two reflected beams into the required phase relationship at the point where they recombine in the coupling region of the coupler 20. The general problem with this approach is that the amount of phase shift required for this purpose is unlikely to remain constant since environmental factors, such as changes of temperature, are unlikely to affect the two physically separated and independent Bragg grating fibers in precisely the same way. It has been found however that, in respect of 2×2 single mode optical fiber fused tapered couplers made by the above-identified progressive stretching method, on each side of the coupling region there is a very high degree of symmetry between the two fibers over the region extending all the way from the coupling region to where the fibers diverge from secured side-by-side contact. This symmetry is found sufficient to preserve the phase relationship of monochromatic light propagating in the two fibers from the coupling region to this point of divergence. In consequence, if identical Bragg distributed gratings are made in the two fibers within this region at equal distances from the coupling region, it will be found that the required phase relationship of the light reflected by the gratings to interface in the coupling region automatically results without having to have recourse to the use of any phase adjustment means either active or passive.

Figure 3:
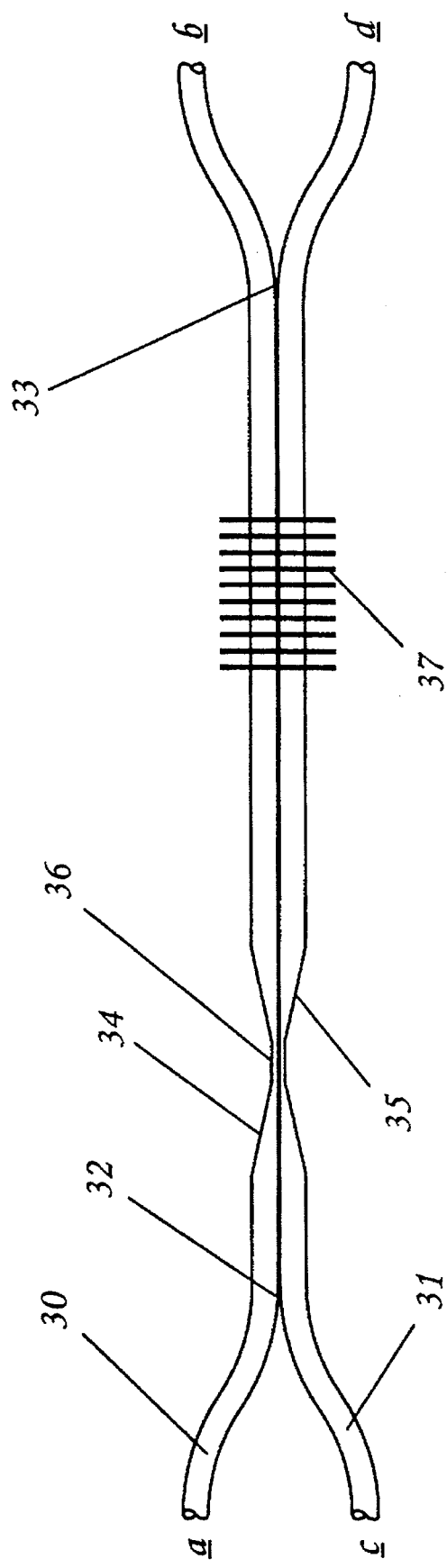
FIGS. 3, 4 and 5 depict different forms of optical element each embodying the present invention in a different preferred form.

Referring now to FIG. 3, two consecutive lengths of single mode fiber are taken from a single source of photosensitive optical fiber, such as boron/germania doped fiber, and the plastics protective coating is removed from a portion of each to expose lengths 30, 31 of bare fiber. (The use of consecutive lengths from a single source ensures that the two are very closely matched). The two fibers are brought together into side-by-side contact, for example by stranding the two bare fibers over a certain length but, for illustrative convenience, this stranding is not illustrated in FIG. 3 or any of the other drawings. From these stranded fibers a 2×2 fused tapered coupler is made by a progressive stretching method to which previous reference has been made and substantially as described in GB 2 150 703A with particular reference to its FIG. 3. For this purpose the fibers are secured between two blocks (not shown) which are moved in the direction of longitudinal extent of the fibers so as to traverse the fibers longitudinally through a localized hot zone produced by a small flame (not shown). To produce a stretching traverse, the leading block is translated faster than the trailing block, by a predetermined portion, and the resulting tensile stress is accommodated by localized stretching occurring where the fibers are heat-softened in the hot zone. Before the first stretching traverse, one or more non-stretching traverses are made in order to fuse the two fibers together along their line of contact from a point 32 to a point 33. After this, a succession of stretching traverses are performed so as to produce two tapered regions 34, 35 with an intervening region 36 of constant cross-section, these regions compassing the coupling region of the coupler. The stretching is halted when the first 3 dB coupling point is reached. Then a uniform pitch Bragg distributed grating 37 is created in the fibers 30, 31 between the end of the taper 35 and the end point 33 of the length over which the two fibers are secured together by fusion. With this structure, light that is launched into input port a of fiber 30 is divided by the coupling region 34, 36, 35 into two phase quadrature components of equal amplitude propagating towards ports b and d respectively of fibers 30 and 31. The Bragg gratings reflect the portion of this light at the Bragg wavelength, and the two reflected components interfere in the coupling region to produce a single component propagating towards output from port c.

Figure 4:
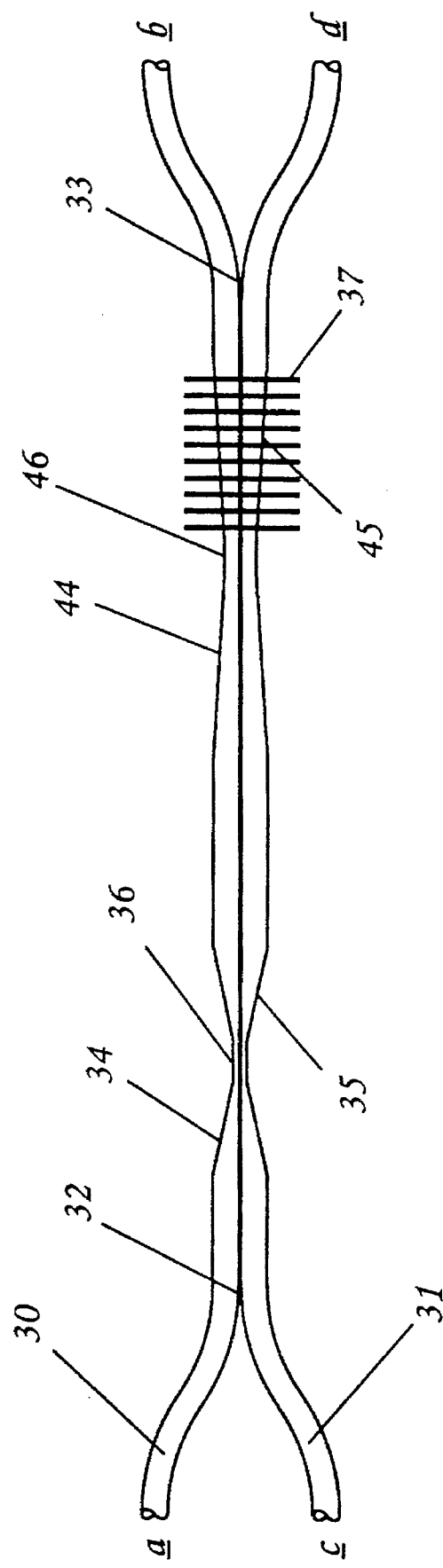

Typically the optical elements of both FIGS. 1 and 3 have Bragg distributed gratings of uniform pitch so that they shall be reflecting within a narrow frequency band. In GB 2 161 612A there is described a dispersive optical element which can be used for dispersion compensation in an optical transmission system. The basic construction of this dispersive optical element may comprise a structure just as described above with reference to FIG. 1 except for the fact that the Bragg distributed grating has a non-uniform pitch so that different wavelengths are reflected at different distances from port b of the circulator 12. Clearly the replacement of the uniform pitch grating 37 of FIG. 3 with a non-uniform one would achieve a similar result, and hence produce an alternative form of dispersive optical element. In view of the difficulties involved in creating non-uniform pitch Bragg distributed gratings in optical fibers, as compared with the creation of uniform pitch ones, it is preferred to generate an equivalent effect by creating a uniform pitch grating in a non-uniform stretch of fibers as now to be described with particular reference to FIG. 4.

The construction of this element commences with the construction of a 2×2 fused tapered 3 dB coupler identical with that of FIG. 3, except for the choice of a geometry that leaves a distance between the large end of the taper 35 and the end point 33 of the fusing together of the two fibers 30, 31 that is typically greater than before because this region is required to accommodate an additional structure. This additional structure comprises two further tapered regions 44, 45, typically with an intervening region 46 of constant cross section. These regions 44, 45 and 46 are created by the same progressive stretching technique as was used for the creation of the corresponding regions 34, 35 and 36, but in this instance the draw-down ratio is significantly smaller. In particular the draw-down ratio is specifically left small enough to leave the two fibers 30, 31 substantially uncoupled in the regions 44, 45 and 46. On the other hand the draw-down ratio is large enough for there to be a significant difference between the propagation constant at the large ends of the tapers 44, 45 and that at their small ends. The change in propagation constant that results from the drawing down of a single mode optical fiber can be explained phenomenologically as a reduction in effective refractive index ($n_{eff}$) of the fiber occasioned by the expansion of the model spot size resulting in an ever greater propagation of the guided energy being caused to propagate in the cladding rather than in the higher refractive index core region. By way of example, the progressive stretching to produce the tapers 44, 45 may typically comprise about 20 traverses to produce tapers about 10 mm long in which the diameter of the individual fibers tapers from about 125 μm at the large end to about 50 μm at the small end. Typically the tapers are specifically constructed such that the resulting variation in $n_{eff}$ is linear along the taper, but this is not necessarily the case.

It should be appreciated that the progressive stretching method is particularly well suited to the making of these tapers 44, 45 because it is not the temperature profile in the localized hot zone that fully determines the profile of the taper. Each successive traverse of the progressive stretching produces a pair of microsteps in the fiber profile, one at each end of the traverse. The precise locations and heights of these pairs of microsteps are independently controllable through the independent control of the start and stop positions of each traverse and of the draw-down ratio employed. Accordingly essentially any desired profile of smooth taper in the fiber can be synthesized by the appropriate configuration of microsteps, and, with closely spaced microsteps, the sole effect of the temperature profile in the hot zone is that of smoothing out its constituent microsteps.

After these tapers 44, 45 have been produced, a uniform pitch Bragg distributed grating 37 is created in one of those tapers. If the grating is created in taper 45, as illustratively depicted in FIG. 4, then the light propagating from the coupling region 34, 36, 35 towards ports b and d is propagating in this taper in a region where $n_{eff}$ is increasing, and hence where also the Bragg wavelength is increasing. Accordingly the shorter wavelengths are reflected ahead of the longer wavelengths, and thus the element functions as a device exhibiting negative (anomalous) dispersion. The opposite would be the case if the Bragg grating 37 were instead formed in the taper 44.

The optical fiber element of FIG. 3 has been described in the first instance as a filter, but this is not the sole function to which this element may be put. Thus, provided that the reflectivity provided by the grating 37 is less than 100% within its reflection waveband, residual non-reflected power in this waveband emerges by way of ports b and d, and so these ports may be used as signal taps. Under suitable circumstances the optical fiber element of FIG. 3 may also be used as a wavelength multiplexer, for instance in an erbium doped fiber amplifier for multiplexing signal power at a wavelength in the region of 155 nm with optical pump power at a wavelength in the region of 980 nm. The coupling region 36 is in this instance designed to provide a coupling strength that produces 3 dB coupling between the two fibers at a wavelength of 1550 nm, while providing substantially no coupling between the fibers for light at a wavelength of 980 nm in consequence of the fact that the shorter wavelength light is much more tightly bound to the fiber core than the larger wavelength light even where the fiber diameter is reduced in the coupling region 36. To function in this way as a multiplexer, the signal power is applied to port a and the pump power to port d so as to provide a multiplexed output from port c. Additionally if the grating 37 is less than 100% reflective of light at the signal wavelength, the port b can be used as a signal tap.

A further preferred embodiment of the present invention will now be described with particular reference to FIG. 5. This may variously be described as a wavelength multiplexer or demultiplexer, or a channel insertion, or channel dropping, filter. The construction of this element similarly commences with the construction of a 2×2 fused tapered 3 dB coupler identical with that of FIG. 3, except for a choice of geometry similar to that of FIG. 4 that leaves a distance between the large end of the taper 35 and the end point 33 of the fusing together of the two fibers that is typically greater than in the case of the FIG. 3 element because this region is required to accommodate an additional structure. This additional structure comprises a second set of two tapered regions 54, 55 with an intervening region 56 of constant cross-section constructed in the same way as their counterparts 34, 35 and 36. These three regions 54, 56, 55 compass a second coupling region identical with that of regions 34, 36 and 35, so that in this way there is formed a tandem pair of 3 dB couplers interconnected with two portions 50, 51 of equal length of the fibers 30, 31. Then a uniform pitch Bragg distributed grating 37 is created in portions 50, 51 of the two fibers 30, 31.

The combination of the Bragg distributed grating 37 with the first 3 dB coupling region compassed by regions 34, 36 and 35 acts in the same manner as its counterpart in the optical element of FIG. 3. Accordingly, light at the Bragg wavelength that is launched into the element by way of port a of fiber 30 is selectively reflected by the grating to emerge substantially exclusively by way of port c of fiber 31. Light of other wavelengths that is launched into port a, and is not reflected by the grating, continues in its propagation through portions 50, 51 of fibers 30, 31 towards the second 3 dB coupling region. The phase quadrature relationship that results from the beam-splitting in the first 3 dB coupling region is maintained all the way to the second coupling region, and hence in this second coupling region the light produces an interference effect which launches that light to emerge from the optical element substantially exclusively by way of port d of fiber 31. It will be evident that, if it is desired to drop or insert more than one channel by way of port c this can readily be arranged by creating more than one Bragg distributed grating in the portions 50, 51 of fibers 30, 31. It will similarly be evident that the uniform pitch grating 37 could be replaced by a chirped grating to provide a broadened spectrum of reflection by the grating, and that a similar effect can be achieved with a uniform grating by including within the portions 50, 51 further tapers like the tapers 44, 45 of the optical element of FIG. 4.

Figure 5:
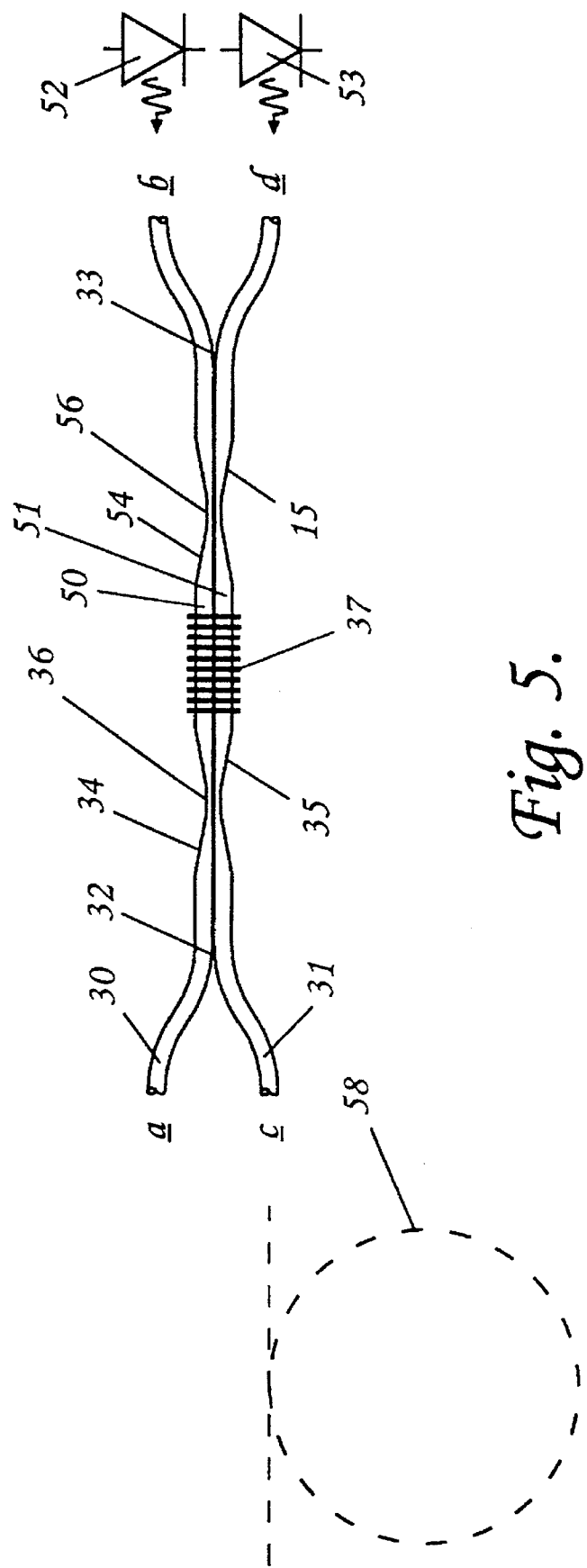

The optical fiber element of FIG. 5 can, like that of FIG. 3, be used as a multiplexer for multiplexing signal power with pump power in an optical amplifier. Thus, if signal power at 1550 nm is applied to port a, pump power at 980 nm from a source 53 may be applied to port d to provide a multiplexed output from port c for application to an erbium doped optical fiber amplifier 58. The pump power applied to the element by way of port d is of short enough wavelength for substantially none of its power to be coupled from fiber 31 to fiber 30 in either of the coupling regions 36 and 56, and hence this light proceeds directly to port c. Pumping with light at 1480 nm can also be used. In this instance the wavelength is close enough to the signal wavelength for the coupling regions to act as 3 dB couplers not only for the 1550 nm signal wavelength but also for the 1480 nm pump wavelength. The 1480 nm pump power from a source 52 is therefore applied to port b. The coupling region 56 divides this power into two substantially equal components propagating respectively in portions 50 and 51 of fibers 30 and 31. The matching optical path distances of these two portions 50 and 51 ensures that, when these two components are caused to interfere in coupling region 36, their power emerges from the coupling region substantially exclusively in fiber 31 to emerge from the optical fiber element by way of port c. It is seen therefore that because pumping at 1440 nm employs a different pump power input port from that required for pumping at 980 nm, the amplifier can if desired be simultaneously pumped with both wavelengths.

We claim:

1. An optical fiber element incorporating a 2×2 single mode tapered fused fiber coupler structure formed from two single mode optical fibers of substantially identical cross-section secured together in side-by-side contact over a length that includes sequentially a first portion where the fibers are drawn down to an extent providing mutual optical coupling between the two fibers, and a second portion in which there is substantially no mutual coupling between the fibers and in which second portion substantially identical Bragg distributed gratings are formed in both fibers equidistant from said first portion.

2. An optical fiber element as claimed in claim 1, wherein said mutual coupling between the two fibers in said first portion is substantially 3 dB coupling at a wavelength reflected by the Bragg distributed gratings.

3. An optical fiber element as claimed in claim 2, wherein said Bragg distributed gratings are uniform pitch gratings.

4. An optical fiber element as claimed in claim 3, wherein said uniform pitch gratings are present in tapered regions of said fibers.

5. An optical fiber element as claimed in claim 1, wherein said length includes sequentially said first portion, next said second portion, and then a third portion where the fibers are drawn down to an extent providing mutual optical coupling between the two fibers, and wherein said Bragg distributed gratings are equidistant from said third portion.

6. An optical fiber element as claimed in claim 5, wherein the mutual optical coupling between the two fibers in said first portion and in said third portion is substantially 3 dB coupling at a wavelength reflected by the Bragg distributed gratings.

7. An optical fiber element as claimed in claim 6, wherein said Bragg distributed gratings are uniform pitch gratings.

8. An optical fiber element as claimed in claim 7, wherein said uniform pitch gratings are present in tapered regions of said fibers.

9. An optical fiber amplifier having a signal input port, a signal output port, an optical pump source and a length of optically amplifying waveguide optically pumped by the optical pump source via a wavelength multiplexer, which multiplexer includes a 2×2 single mode tapered fused fiber coupler formed from two single mode optical fibers of substantially identical cross-section secured together in side-by-side contact over a length that includes sequentially a first portion where the fibers are drawn down to an extent providing substantially 3 dB mutual coupling between the two fibers at a signal wavelength optically amplified by the optically amplifying wavelength, and a second portion in which there is substantially no mutual coupling between the fibers and in which second portion substantially identical Bragg distributed gratings are formed in both fibers equidistant from said first portion, the periodicity of which gratings renders them spectrally selectively reflecting to light propagating in the two fibers at said signal wavelength.

10. An optical fiber amplifier as claimed in claim 9, wherein the optical pump source emits at a pump wavelength for which the mutual coupling between the two fibers in said first portion is substantially zero.

11. An optical fiber amplifier as claimed in claim 9, wherein the optical pump source emits at a pump wavelength for which the mutual coupling between the two fibers in said first region is also substantially 3 dB, and wherein said length of said 2×2 coupler over which the two fibers are secured together in side by side contact includes sequentially said first portion, next said second portion, and then a third portion where the fibers are drawn down to an extent providing substantially 3 dB mutual coupling between the two fibers at said signal wavelength and at said pump wavelength.

12. An optical fiber amplifier as claimed in claim 11 which amplifier includes a second optical pump source which second pump source emits at a wavelength for which the mutual coupling between the two fibers in said first portion is substantially zero.

13. A method of making an optical fiber element from two single mode optical fibers of substantially identical cross-section, in which method the two fibers are fused together in side-by-side contact over a specific length thereof, wherein mutual coupling between the two fibers over a first portion of said length is created by drawing them down using a set of progressive stretching operations upon the fibers while they are traversed longitudinally through a localized hot zone in which they are locally heat-softened, and wherein, at a second portion of said length beyond said first portion, Bragg distributed gratings are created simultaneously in both fibers equidistant from said first portion.

14. A method as claimed in claim 13, wherein said progressive stretching operations are terminated immediately substantially 3 dB mutual coupling between the fibers at a wavelength reflected by the Bragg gratings has been established.

15. A method as claimed in claim 13, wherein mutual coupling between the two fibers is also created over a third portion of said length by substantially the same method employed to create the mutual coupling between the two fibers at said first portion of said length, said third portion lying on the side of said second portion that is remote from first portion.

16. A method as claimed in claim 15, wherein the creation of the mutual coupling in each of said first and said third portions is terminated immediately substantially 3 dB mutual coupling between the fibers at a wavelength reflected by the Bragg gratings at said portion has been established.

* * * * *